United States Patent
Tuchiya et al.

(10) Patent No.: US 6,676,778 B1
(45) Date of Patent: Jan. 13, 2004

(54) METHOD FOR BONDING SLIDER AND SUSPENSION TOGETHER AND DECIDING CONDITIONS OF LASER BEAM IRRADIATION

(75) Inventors: Tatsumi Tuchiya, Aase (JP); Tatsushi Yoshida, Chigasaki (JP); Naoki Fujii, Fujisawa (JP); Surya Pattanaik, San Jose, CA (US); William A. Childers, Morgan Hill, CA (US); Diane Sprandel O'Regan, Los Gatos, CA (US); Naoki Suzuki, Yokohama (JP); Yuhsuke Matsumoto, Fujisawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 316 days.

(21) Appl. No.: 09/596,630
(22) Filed: Jun. 19, 2000
(51) Int. Cl.[7] .............................. B32B 31/28; G11B 5/48
(52) U.S. Cl. .................. 156/64; 156/73.6; 156/272.8; 156/275.5; 156/275.7; 360/234.6; 360/234.7
(58) Field of Search .................. 156/272.8, 275.5, 156/275.7, 64, 73.6, 295; 360/234.5, 234.6, 234.7

(56) References Cited

U.S. PATENT DOCUMENTS

| | | | | |
|---|---|---|---|---|
| 5,408,365 A | * | 4/1995 | Van Doorn et al. ........... 360/46 |
| 5,690,766 A | * | 11/1997 | Zwick ........................ 156/73.6 |
| 5,732,459 A | * | 3/1998 | Shiraishi et al. ........... 29/603.06 |
| 5,877,919 A | * | 3/1999 | Foisy et al. ................ 360/234.5 |
| 6,007,664 A | * | 12/1999 | Kuizenga et al. .......... 156/272.8 |
| 6,123,781 A | * | 9/2000 | Shimazawa .................. 148/108 |
| 6,219,202 B1 | * | 4/2001 | Palmer ...................... 360/234.5 |
| 6,261,492 B1 | * | 7/2001 | Iovdalsky ..................... 264/69 |

FOREIGN PATENT DOCUMENTS

WO      WO 95/13612      *  5/1995      ........... G11B/5/60

* cited by examiner

Primary Examiner—Jeff H. Aftergut
Assistant Examiner—Todd J. Kilkenny
(74) Attorney, Agent, or Firm—Robert B. Martin; Bracewell & Patterson, L.L.P.

(57) ABSTRACT

A slider and suspension of a hard disk drive are joined with a low modulus epoxy adhesive. The slider and suspension are set in a bonding jig while they are moving from process to process or subjected to a thermosetting treatment in a controlled temperature chamber. The slider and suspension must be kept bound together with the bonding jig until the adhesive is cured through a thermal treatment. The low modulus epoxy adhesive is cured with heat from a laser beam. In addition, a resistance value of the head disposed at the slider is measured so as to monitor the temperature of the head, thereby deciding both output and irradiation time of the laser beam for obtaining a desired strength of the bond within a predetermined temperature range.

7 Claims, 12 Drawing Sheets

[Figure 1]
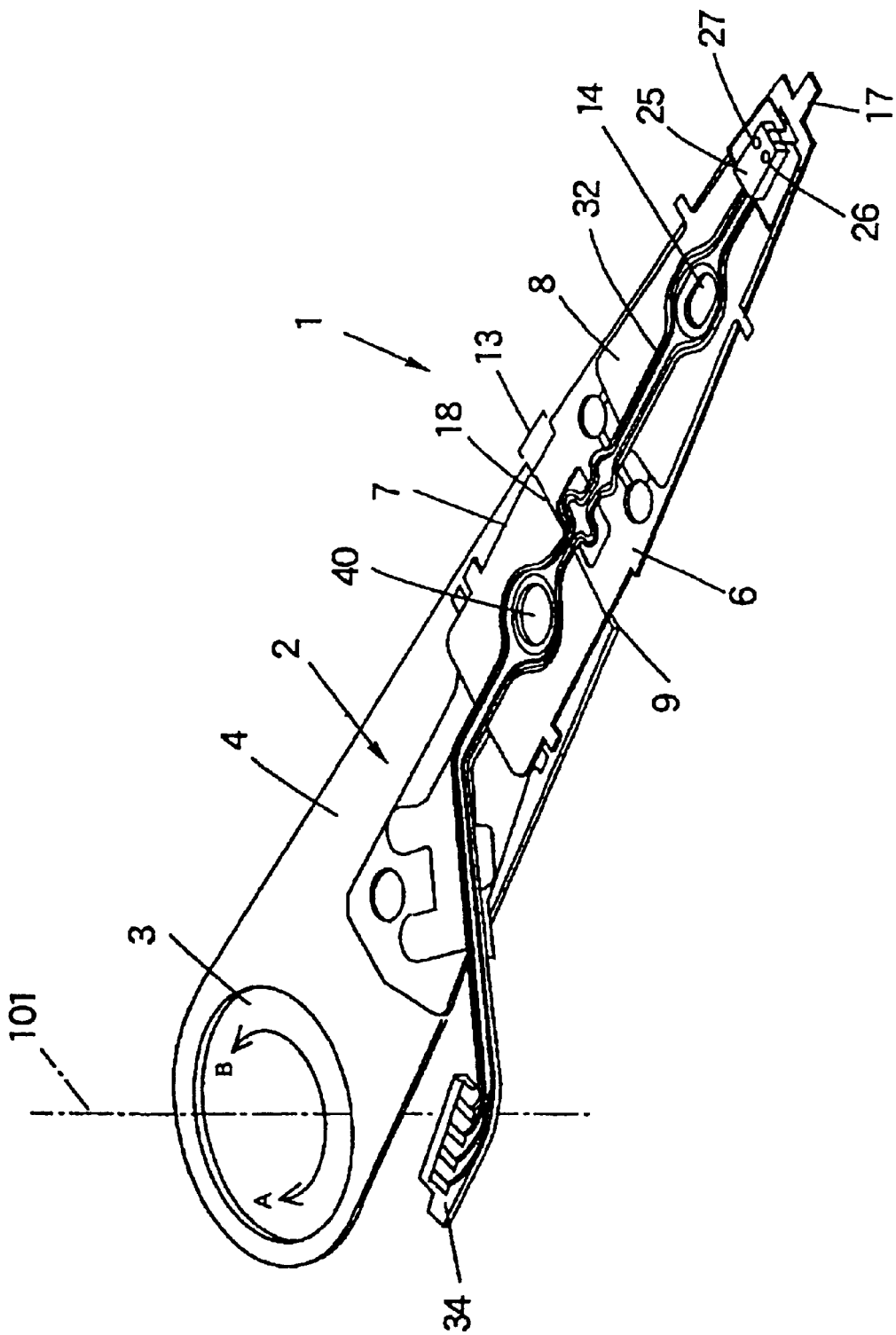

[Figure 2]
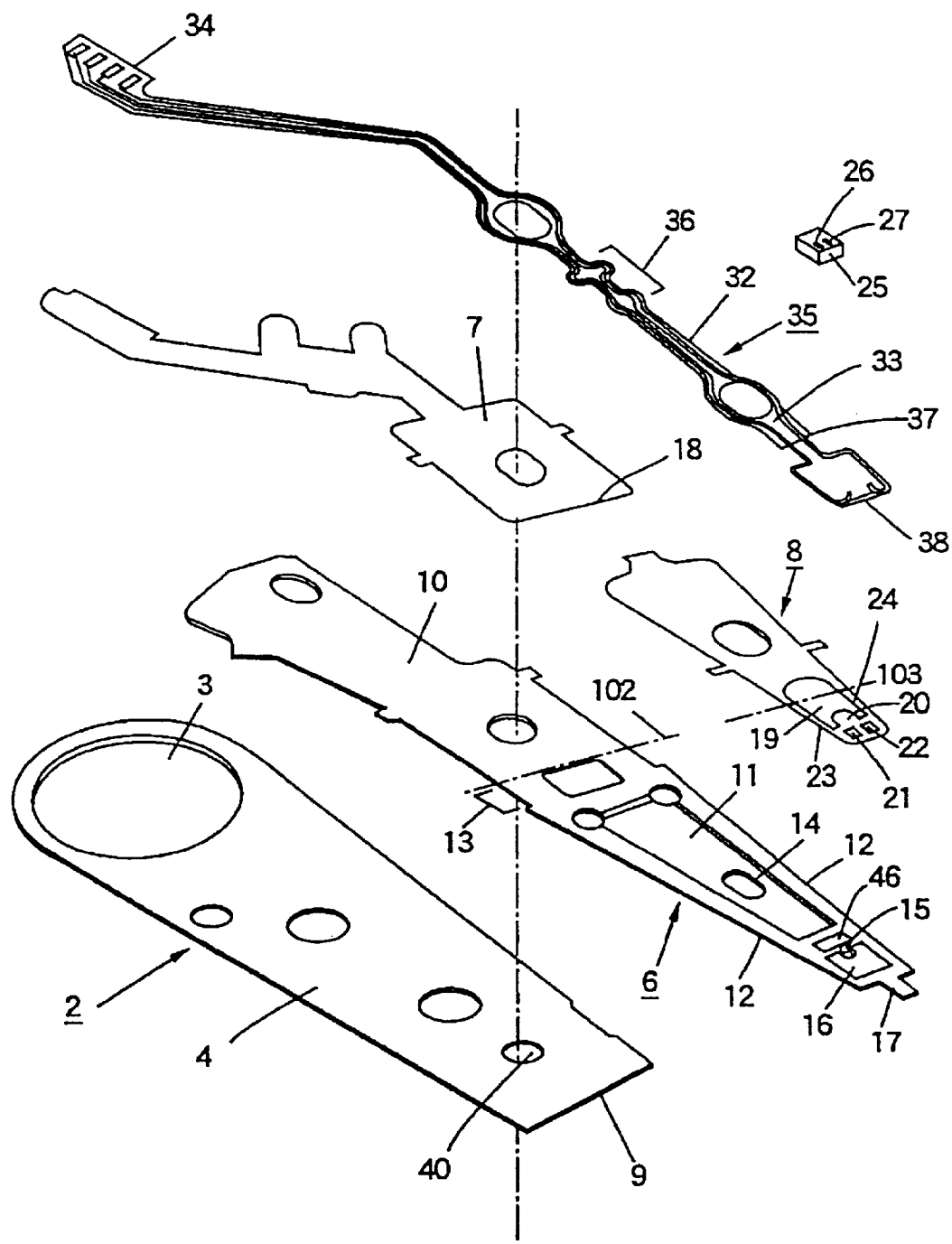

[Figure 3]
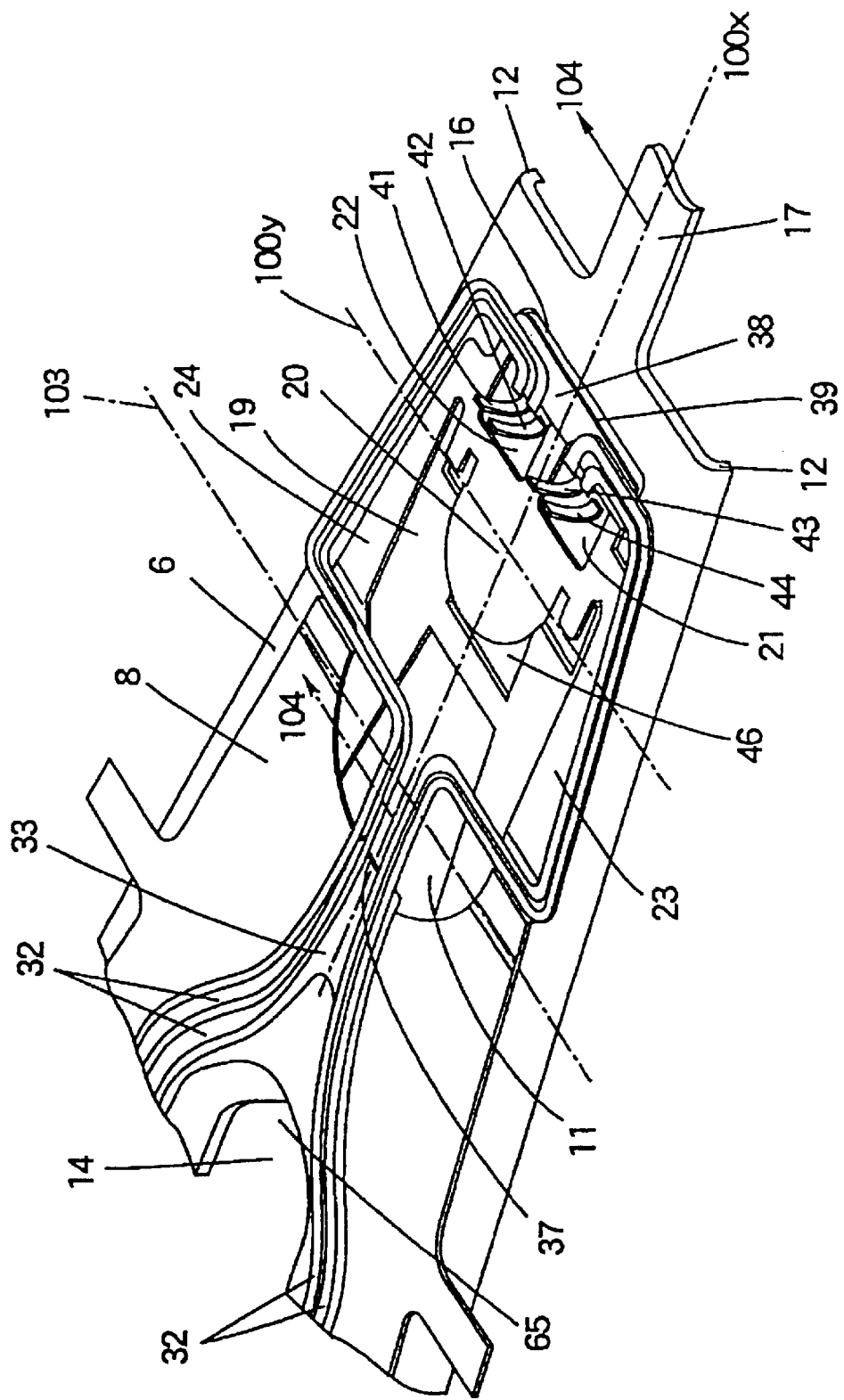

[Figure 4]
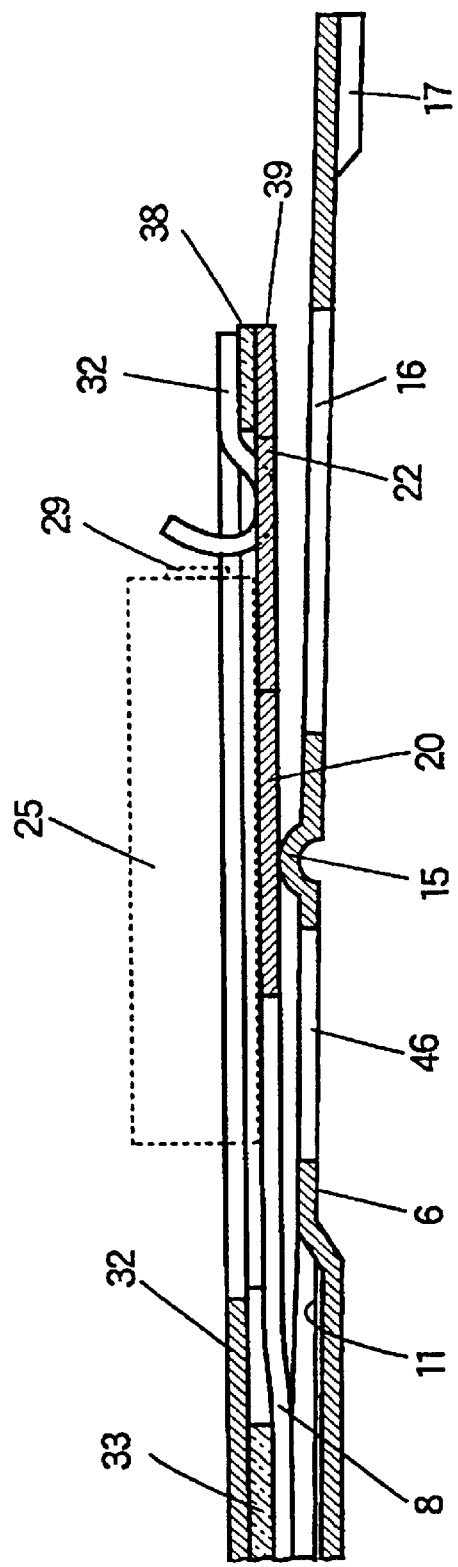

[Figure 5]
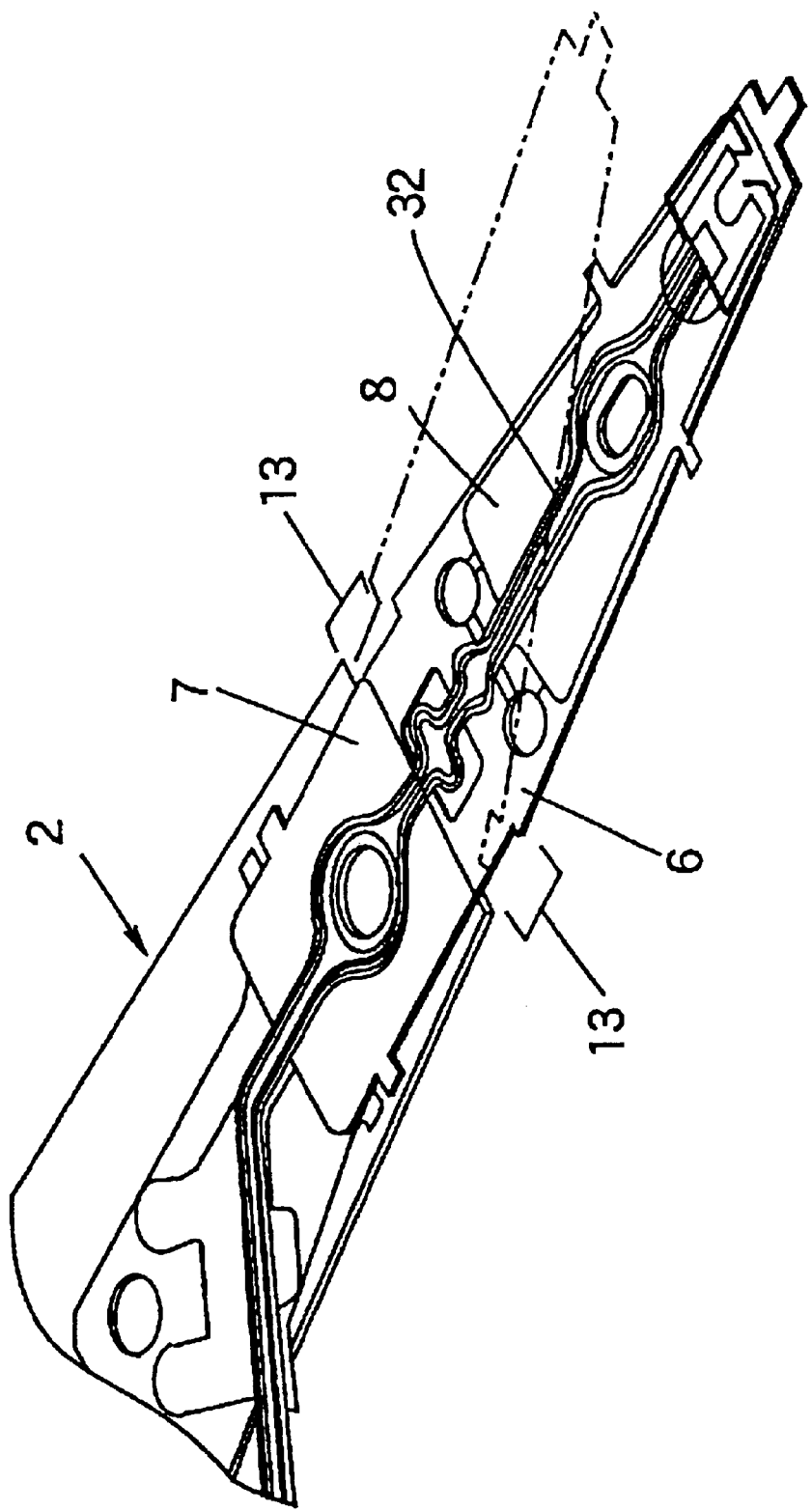

[Figure 6]
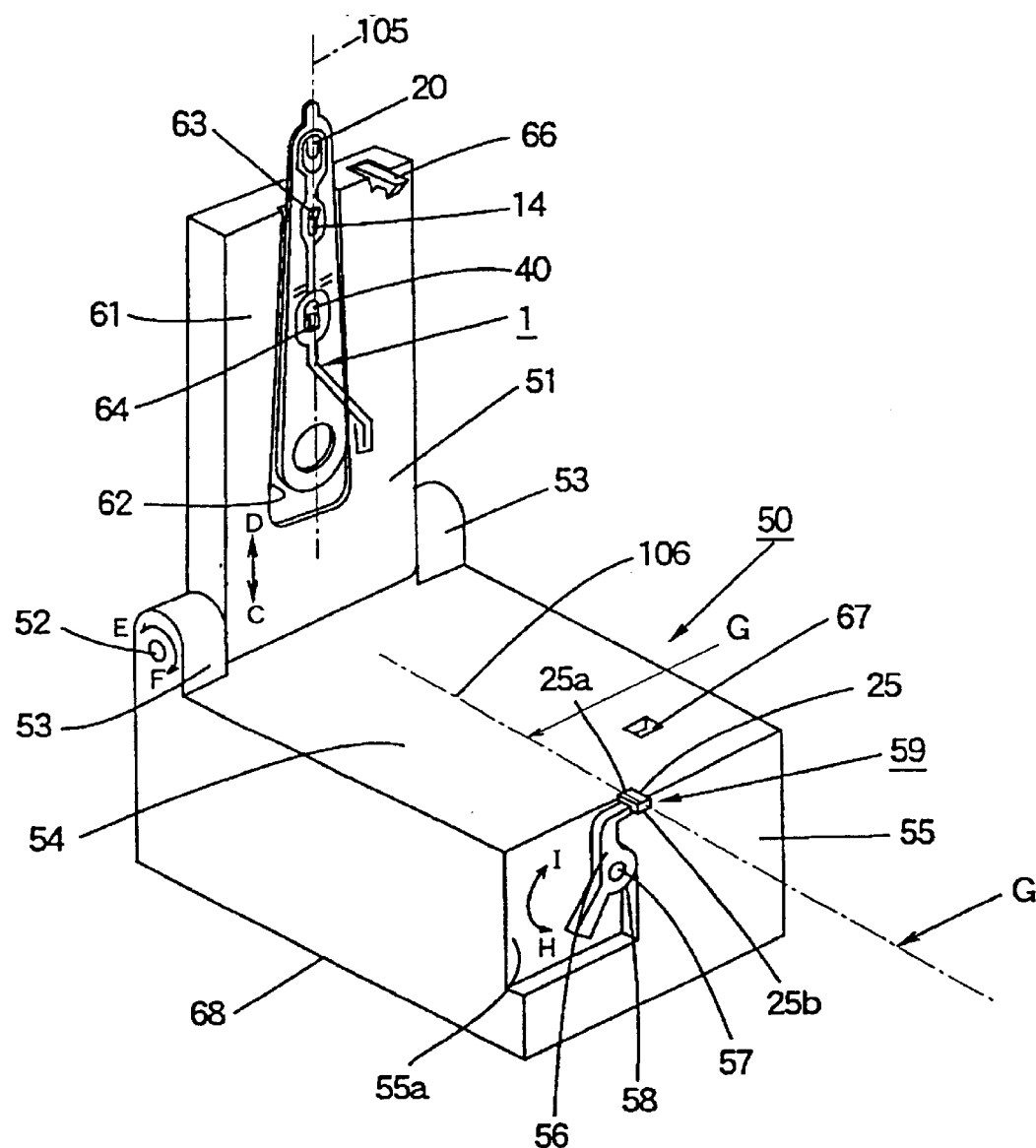

[Figure 7]
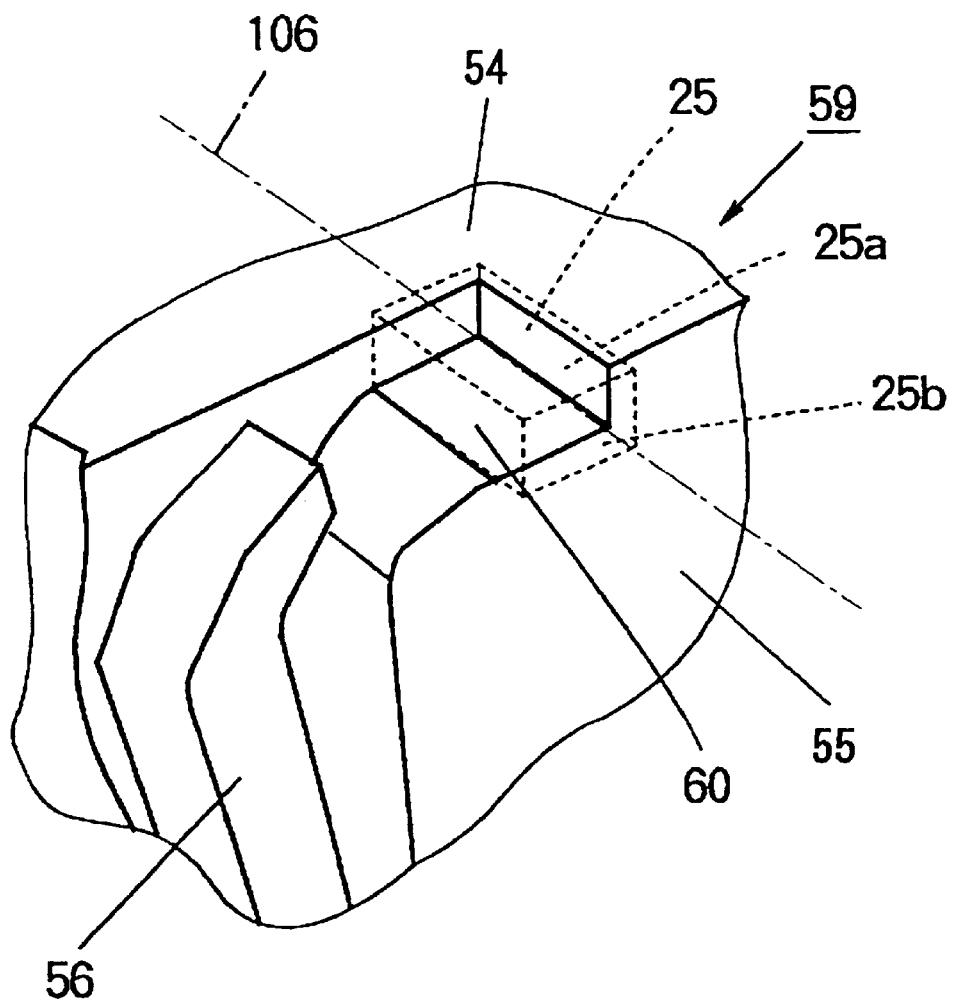

[Figure 8]
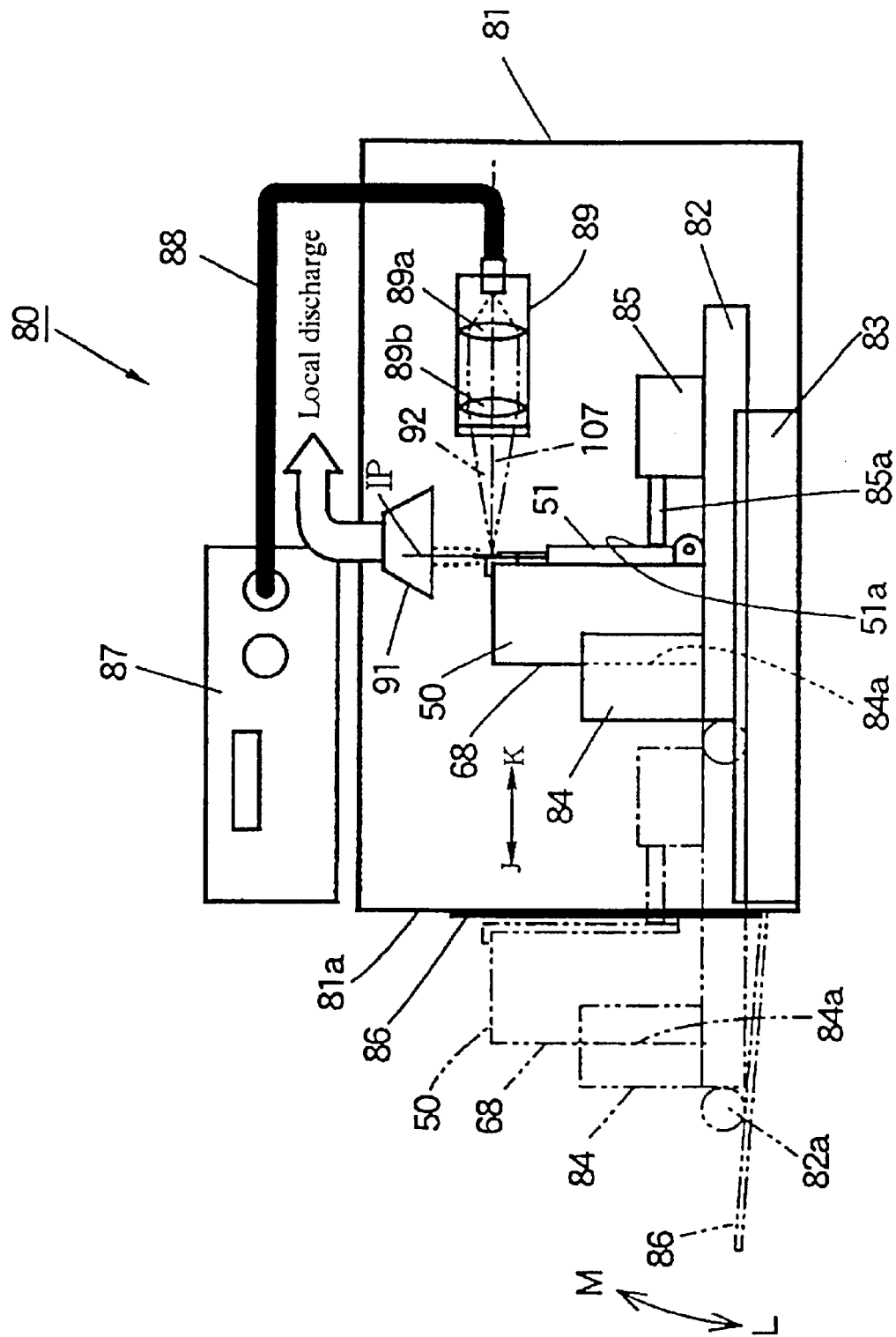

[Figure 9]
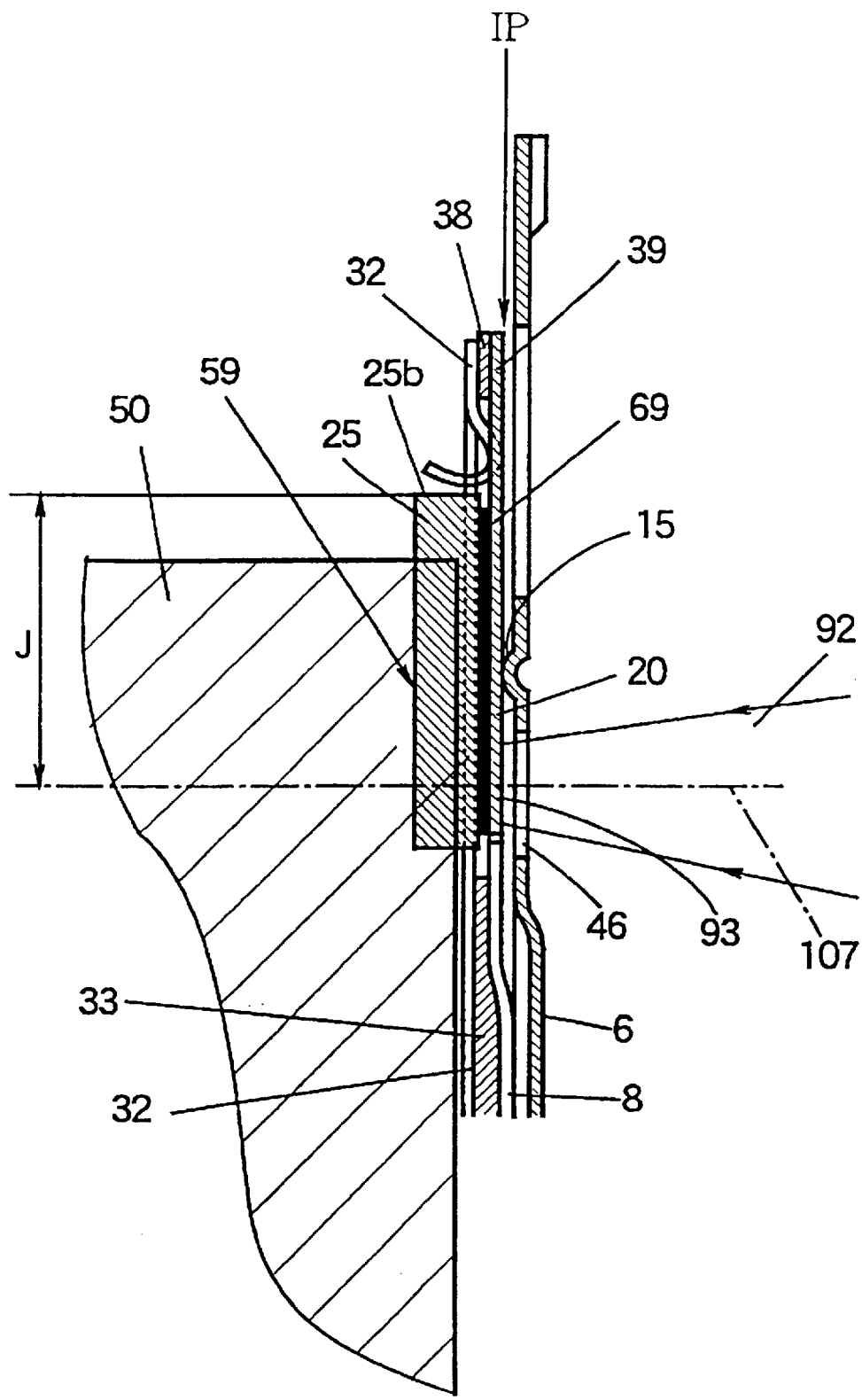

[Figure 10]
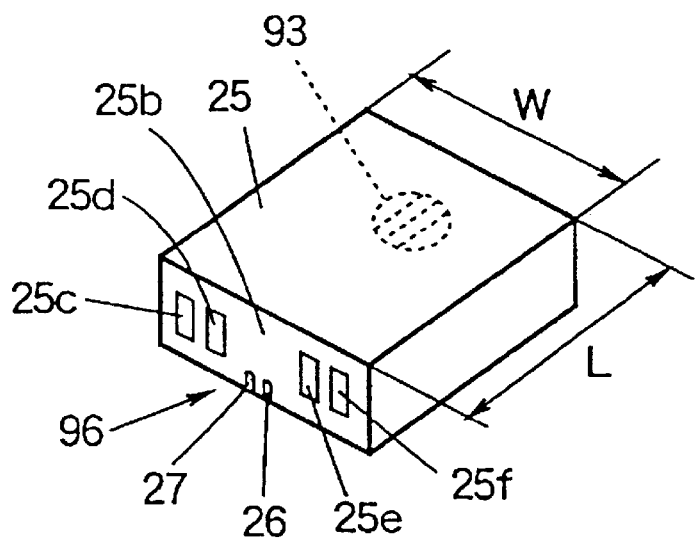
[Figure 11]
(a)
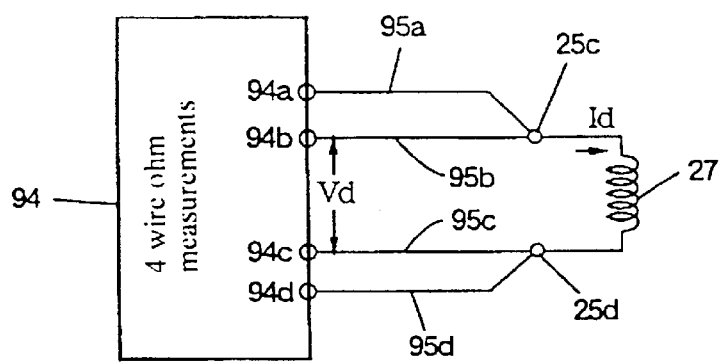
(b)
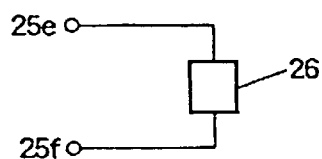

[Figure 12]
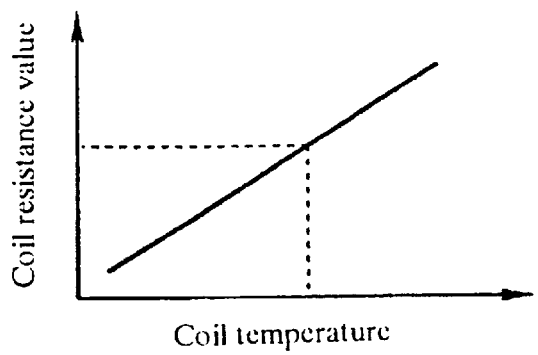
[Figure 13]
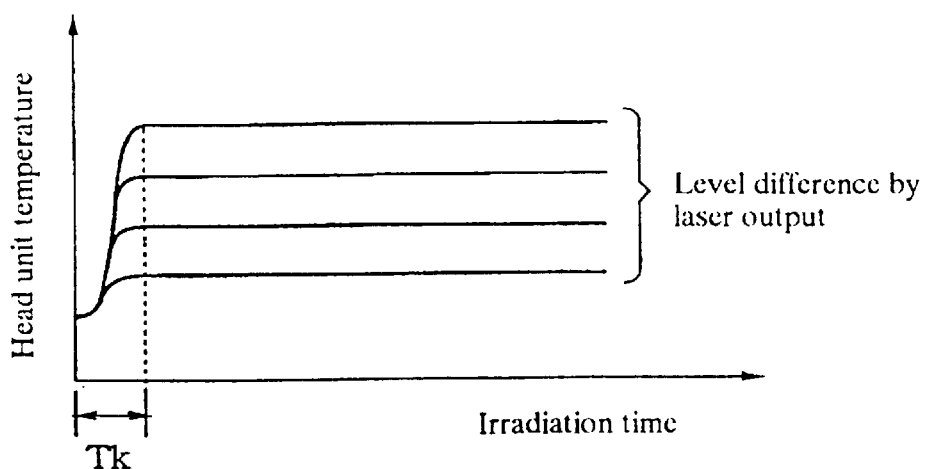
[Figure 14]
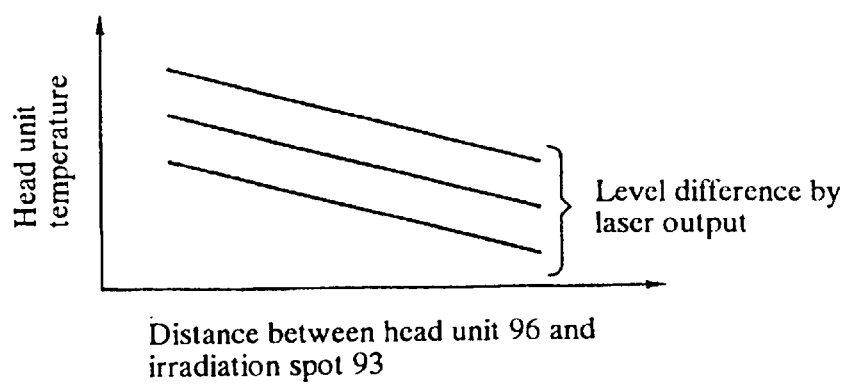

[Figure 15]
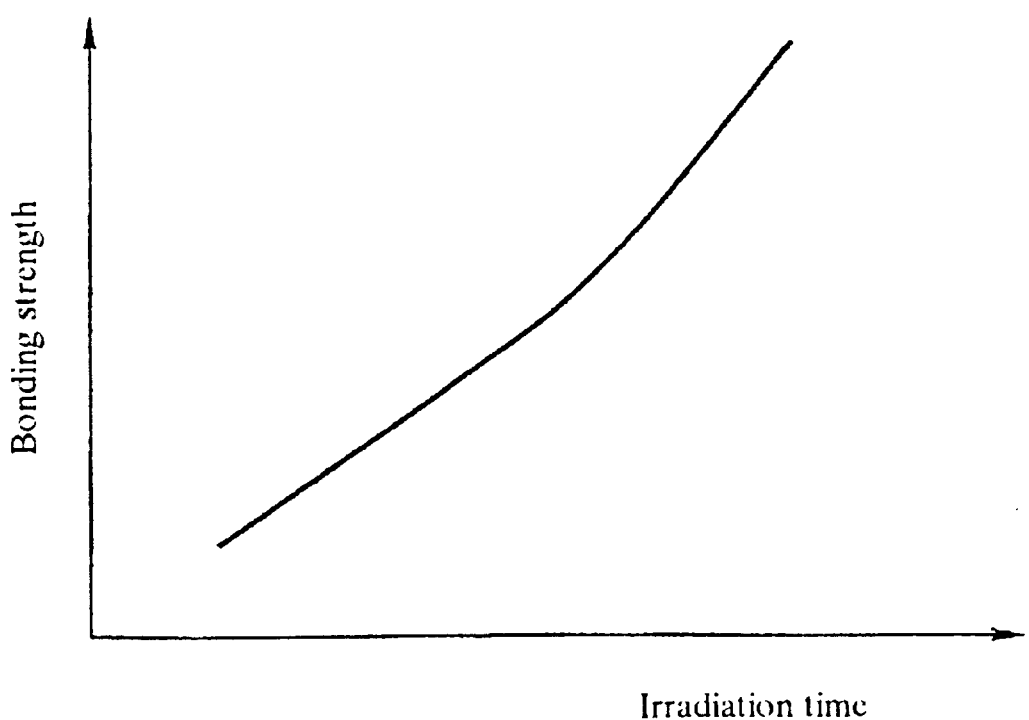

METHOD FOR BONDING SLIDER AND SUSPENSION TOGETHER AND DECIDING CONDITIONS OF LASER BEAM IRRADIATION

TECHNICAL FIELD

The present invention relates to a method for bonding a slider and a suspension of a head gimbal assembly (hereafter referred to as an HG assembly) together, which is a component of a hard disk drive (HDD) unit. More particularly the invention relates to a method for fixing a slider and a suspension together temporarily when a low modulus epoxy adhesive is used for bonding said slider and said suspension together.

DESCRIPTION OF RELATED ART

In prior art technologies, such a cyanoacrylate adhesive as an instantaneous adhesive or the like, have been used to bond sliders disposed at the tip of an HG assembly to a suspension. However, such an adhesive often causes the slider to be warped and/or distorted due to changes of the ambient temperature if the expansion coefficient differs between the slider and the suspension.

This warp and/or distortion, caused by an effect similar to that of bimetal, changes the "crown" that indicates warping in the direction of the slider in which the air flows in and out, and/or the "camber" that indicates warping in the direction orthogonal to that direction. Because this "crown" and/or "camber" affects the flying property of the slider significantly, the static posture of the HG assembly is changed unfavorably. Thus, a write head or read head disposed at the slider is disabled for writing/reading data in/from a disk.

To solve this problem, a low modulus epoxy adhesive has been used to absorb the difference of thermal expansion between materials with its own elasticity. The published but unexamined Japanese Patent Application No. 11-123488 by the present inventor discloses a method for bonding a slider and a suspension together with use of such an epoxy adhesive.

As shown in FIG. 6, this method uses a bonding jig 50 that will be described in greater detail below. A slider 25 is fixed to a slider mount 59 and an HG assembly 1 to which the slider 25 is not bonded yet is held on an HG assembly holding plate 51. In this state, a low modulus epoxy adhesive is dispensed on a bonding surface 25a of the slider 25, then the HG assembly holding plate 51 is rotated so that a flexure tongue 20 comes in contact with the bonding surface 25a.

At this time, a locking hook 66 is fit in an engaging hole 67 and the flexure tongue 20 comes in contact with the bonding surface 25a, thereby the flexure tongue 20 is slightly more pressed against the bonding surface 25a. After that, a predetermined vibration is applied to this contact portion between the flexure tongue 20 and the bonding surface 25a so that both items 20 and 25a are bonded uniformly.

The low modulus epoxy adhesive employed here is a thermosetting adhesive, so the adhesive is heated and cured while the flexure tongue 20 is bound to the bonding surface 25a as described above so as to bond the flexure tongue 20 to the surface 25a. For example, the bonding jig that is holding the HG assembly is put in a controlled temperature chamber as described above, then it is exposed to a high temperature of 120° C. for approximately 30 minutes. The flexure tongue 20 is thus fixed to the bonding surface 25a. This heating process may be carried out after the flexure tongue 20 is put in contact with the bonding surface 25a or more later, for example, in the final process.

However, in any of the above cases, the jig must be put in the controlled temperature chamber together with the HG assembly, so that the space in the controlled temperature chamber is not used so efficiently. In addition, because the jig is also heated, the thermal efficiency is not so high for the thermal capacity of the jig. If the heating process is carried out more later, both HG assembly and jig are moved from process to process, thereby more jigs are needed and the work efficiency is further lowered.

Under such circumstances, it is an object of the present invention to provide a method for bonding a slider and a suspension together, which enables the HG assembly bonded by a low modulus epoxy adhesive to be put in a controlled temperature chamber independently or moved from process to process, thereby improving the efficiency of the space usage in the controlled temperature chamber and the thermal efficiency so as to improve the work efficiency more.

SUMMARY OF THE INVENTION

A slider is joined to a suspension with a low modulus epoxy adhesive that is heated to cure the epoxy adhesive. A laser beam is applied to part of the adhesive for thermosetting the part while the slider and the suspension are held by a bonding jig so as to be pressed against each other with the low modulus epoxy adhesive therebetween. The laser beam may be applied to an opposite side where the suspension contacts the low modulus epoxy adhesive so that the beam axis of the laser beam hits the other side surface in an approximately vertical direction. The laser beam may be approximately 0.2 mm to 0.6 mm in diameter at its irradiation point if the slider is approximately 1.2 mm in length and 1 mm in width. The laser beam may be applied only at a predetermined output value and only for a predetermined time.

Furthermore, it is an object of the present invention to provide a method for bonding a slider and a suspension together, which includes a step for checking temperature properties of the resistance value of a head disposed at a slider. In addition, there is a step for detecting an ambient temperature of the head by measuring the resistance value so as to set both of the output value and the irradiation time of the laser beam. The output value and the irradiation time of the laser beam are decided so as to obtain a desired bonding strength of the low modulus epoxy adhesive through thermosetting of part of the adhesive by irradiation of the laser beam. within a predetermined upper limit temperature of the head. The resistance of the head may be a resistance of a write head coil.

When measuring the resistance, a four-wire ohm measurement should preferably be used to measure the resistance according to both of a constant current applied between a pair of pads formed at the slider so as to be connected electrically to the coil and a voltage measured between the pads.

BRIEF DESCRIPTION OF THE DRAWINGS

FIG. 1 is a perspective view of an HG assembly 1 employed for an embodiment of the present invention;

FIG. 2 is an exploded perspective view of the HG assembly 1 in which the components are divided into block layers;

FIG. 3 is an enlarged view of a tip portion of the HG assembly 1, prior to joining slider 25;

FIG. 4 is a sectional view of the HG assembly 1 shown in FIG. 3 along the line 104;

FIG. 5 shows the HG assembly 1 showing a deflection range of about 19° (in phantom) at the hinge 13 of the load beam 6;

FIG. 6 is a perspective view of a bonding jig;

FIG. 7 is an enlarged view of a mount of the bonding jig of FIG. 6;

FIG. 8 is a schematic view of a laser tacking apparatus 80 for carrying out the fabricating method of the present invention;

FIG. 9 is a sectional view of the bonding jig 50 along center line 106 (FIG. 6) from the direction of the arrow G when heading for a working position near slider 25;

FIG. 10 is a perspective view of slider 25 showing the positional relationship among the heads, pads, and an irradiation point;

FIG. 11 is a circuit diagram indicating connections between each head and its corresponding pads, as well as the connection between a four-wire ohm measurement and a write head coil;

FIG. 12 is a graph indicating temperature properties of the resistance of the write head coil 27;

FIG. 13 is a graph indicating a relationship between irradiation time and temperature changes of the head unit 96;

FIG. 14 is a graph indicating a relationship between distance from the head unit 96 to the center of the irradiation spot 93 and temperature of the head unit 96; and FIG. 15 is a graph indicating a relationship between irradiation time and bonding strength.

DETAILED DESCRIPTION OF THE PREFERRED EMBODIMENT

FIG. 1 is a perspective view of an HG assembly 1 employed in an embodiment of the present invention. FIG. 2 is an exploded perspective view of the components of the HG assembly 1, which are divided into block layers. In FIG. 2, an actuator arm 2 is held rotationally by holding means of a magnetic disk unit (not shown). At this time, an opening 3 is used to hold the actuator arm 2, which is rotated in the direction of an arrow A or B around a virtual shaft 101 (FIG. 1), which is approximately vertical to a flat portion 4 through the center of the opening 3. The actuator arm 2 is rotated by a voice coil motor (not shown). A load beam 6, a mount plate 7, and a flexure 8 are bonded to each other in a predetermined relationship. The load beam 6 and the flexure 8 are united here to compose a suspension.

A flat portion 10 of the load beam 6 is bonded fixedly to the flat portion 4 of the actuator arm 2. At this time, an end side 9 of the actuator arm 2 is aligned with a directing line 102 (FIG. 2) of the load beam 6. This load beam 6 is made of elastic stainless steel of, for example, 0.038 mm to 0.05 mm in thickness and designed so as to become thin, light, and keep a necessary rigidity.

That is, a recessed portion 11 is formed approximately in a trapezoidal shape in the vertical direction in FIG. 2 by a pressing process at a predetermined portion on which the load beam 6 is not bonded to the actuator arm 2. In addition, both edges of the actuator arm 2 except for the portion 13 close to the end side 9, formed in the longitudinal direction, are bent and formed as flanges 12 (FIG. 3), thereby improving the rigidity of the arm 2. The portion 13 where the flanges 12 are not formed is elastic and composes a hinge.

In the recessed portion 11 of the load beam 6 is formed a tapered elliptic stopper hole 14 and at a portion close to the tip of the load beam 6 is formed an approximate square opening 16. And, at a protruded portion of this opening 16 to the center thereof from the center of a side close to the recessed portion 11 is formed a gimbal pivot 15 (to be described later) elevated upwards in FIG. 3. Between this gimbal pivot 15 and the recessed portion 11 is formed an irradiation opening 46 through which the laser beam passes for laser irradiation to be described later. At the tip of the load beam 6 is formed a tab 17.

Both mount plate 7 and flexure 8 are bonded to the load beam 6. At this time, the mount plate 7 is disposed so that its end side 18 is aligned with the directing line 102 (FIG. 2) of the load beam 6. The flexure 8 is bonded to the load beam 6 so as to cover the trapezoidal recessed portion 11 of the load beam 6 except for the portion closer to the tip from the directing line 103 (FIG. 2).

The flexure 8 is made of stainless steel having a desired elasticity and approximately 20 microns in thickness. An arch-shaped opening 19 is formed between a bonded portion and a non-bonded portion. In the center of the bottom of this opening 19 at a side closer to the tip of the flexure 8 is formed a flexure tongue 20 protruding towards the center of the opening 19. The mount plate 7 may also be made of stainless steel of the same quality as that of the flexure 8.

An integrated conductor lead 35 is composed of four leads 32 that are bonded unitarily. An extremely thin insulating sheet 33 is put between those leads so as not to come in contact with each other. The ends of those leads 32 are aligned with compose a multi-connector 34. The other ends of those leads 34 are bent and processed so as to be connected to the pads 25c, 25d, 25e, and 25f (FIG. 10) (to be described later) formed at the slider 25.

A portion between the multi-connector 34 and the bent portion 36 of the integrated conductor lead 35 (except for the bent portion 36) is bonded onto the mount plate 7 as shown in FIG. 1. A portion between the bent portion 36 (except for the bent portion 36) and the end portion 37 of the insulating sheet 33, as well as the other bent ends of the leads 32 are bonded to the flexure 8 respectively. The other ends of the leads 32 are bonded to the flexure 8 with an insulating sheet 38 therebetween respectively.

A Magneto Resistive head (hereafter, to be referred to as an MR head) 26 for reading data and an electromagnetic induction type write head 27 are disposed at predetermined positions on the slider 25. (The head positions shown in FIGS. 1, 2, and 10 are shown just for convenience, so they are not accurate positions.) This slider 25 is fixed to the flexure tongue 20 by a bonding method to be described later.

Next, a description will be made of dispositions of a pair of flexure arms 23 and 24 formed at both sides of the opening 19 of the flexure 8, a pair of openings 21 and 22 formed close to the tip of the flexure 8, a gimbal pivot 15 formed at the load beam 6, and a slider 25, etc. bonded at the flexure tongue 20.

FIG. 3 is an expanded view of the tip of the HG assembly 1 before the slider 25 is attached to the HG assembly 1. FIG. 4 is a cross sectional view of the HG assembly at a directing line 104.

At the load beam 6 is formed a gimbal pivot 15 (FIG. 4) as described above. On the other hand, the flexure 8 is bonded to the load beam 6 up to the directing line 103. The flexure arms 23 and 24 extending without being bonded support the flexure tongue 20 continuing from the flexure arms 23 and 24 elastically.

Because the load beam 6 and the flexure 8 are bound together, the flexure tongue 20 is supported by the gimbal pivot 15 at one point. This contact portion is on the 100x axis (FIG. 3), which is equivalent to the center line of the flexure 8 in the longitudinal direction. FIG. 3 shows the 100y axis orthogonal to the 100x axis passing through this contact portion. At this time, the flexure arms 23 and 24 are warped a little, thereby pressing the flexure tongue 20 against the gimbal pivot 15.

The slider 25 is disposed at the flexure tongue 20 so that its center portion is approximately put on the contact portion with the gimbal pivot 15 as to be described later (as shown with a broken line in FIG. 4). Consequently, the slider 25 can be rotated a little around both of the 100x axis and the 100y axis, thereby the slider 25 can be declined at a predetermined angle in every direction.

The four leads 32 are fixed to the flexure 8 in a range up to the end 37 of the insulating sheet 33 respectively. However, they are also fixed to the flexure 8 with an insulating sheet 38 therebetween respectively on a platform 39 provided at the outermost tip of the flexure 8 positioned at the other side of the flexure tongue 20 with two openings 21 and 22 therebetween The four leads 32, which are divided into two pairs, are bent like a crank respectively so as to be extended along the flexure arms 23 and 24 and floated in the air so as not to be touched with each another.

The leads 32, which are grouped into two pairs, are bent towards the flexure tongue 20 from the platform 39 with two openings 21 and 22 therebetween. In addition, they are bent like a hook respectively so as to face a connection terminal (not shown) formed at a slider bonded to the flexure tongue 20.

The HG assembly 1 except for the slider 25 composed as described above is bent by, for example, approximately 19° at the hinge 13 of the load beam 6 as shown with a two-dot chain line in FIG. 5. This bent is made due to plasticity deformation and this angle is kept in the natural state.

Next, a description will be made of a method for bonding the slider 25 described above to the flexure tongue 20 of the flexure 8.

FIG. 6 is a perspective view of the bonding jig 50 for positioning and binding the flexure tongue 20 and the slider 25 of the HG assembly 1 together before the slider is bonded to the HG assembly 1.

At one end side of the top surface 54 of the bonding jig 50 is formed a pair of support posts 53 and 53 for rotationally holding an HG assembly holding plate 51 centering around a shaft 52. And, in the center of the other end side facing this one end side is formed a mount 59 for mounting the slider 25.

The HG assembly holding plate 51 is deviated in the direction of an arrow E by deviating means (not shown), thereby the plate 51 is limited for rotation in the same direction at an approximate vertical position shown in FIG. 6.

A recessed portion 55a is formed at an end side surface 55 at a mount 59 side. In this recessed portion 55a is rotationally held a slider fixing lever 56 centering around a shaft 57. This slider fixing lever 56 is rotated and deviated in the direction of an arrow I by a toggle spring 58.

FIG. 7 is an expanded view of this mount 59 and shows the slider fixing lever 56 rotated by a worker in the direction of an arrow H in FIG. 6 against a deviating force. In this state, the slider 25 is set on a slider base 60, so that the slider 25 is fixedly positioned by three adjacent walls as shown with a broken line in FIG. 7.

If the slider fixing lever 56 is released, the tip of the slider fixing lever 56 presses one side of the slider 25, thereby the slider 25 is fixed. FIG. 6 shows such a state at this time. At this time, the bonding surface 25a and the front surface 25b (FIG. 7) of the slider 25 are protruded slightly from the top surface 54 and the end side surface 55 of the bonding jig 50.

At the holding surface 61 of the HG assembly holding plate 51 is formed a storage recessed portion 62 along the external shape of the HG assembly 1 (FIG. 6). This recessed portion 62 is used to fit the HG assembly 1 in itself before the slider 25 is bonded to the assembly. At predetermined positions of this recessed portion 62 are formed a stopper pin 63 and a fixing hook 64 so as to be aligned with the center line 105 of the HG assembly holding plate 51 respectively in the longitudinal direction.

This fixing hook 64 is held by forcing means (not shown) so as to be slid on the center line 105 within a predetermined range and forced in the direction of the arrow C, that is, towards the shaft 52.

At the time of attaching this HG assembly 1 to the HG assembly holding plate 51, a worker fits the fixing hook 64 in an engaging hole 40 of the HG assembly 1, then pulls it in the direction of the arrow D against the force. After that, the worker fits the stopper pin 63 in a tapered elliptic stopper hole 14 of the HG assembly 1.

At this time, the stopper pin 63 is engaged with the stopper end 65 (FIG. 3), at which the stopper hole 14 is reduced in diameter, thereby the 100x axis (FIG. 3) of the flexure 8 is positioned and aligned with the center line 105. The HG assembly 1, when it is in the natural state, is bent by about 19° at the hinge 13 (FIG. 5). When it is attached to the HG assembly holding plate 51, the HG assembly 1 is approximately straight due to the elastic deformation of the hinge 13.

At the tip of the stopper pin 63 where the stopper pin 63 is fit in the stopper hole 14 is formed a projection (not shown). The projection prevents the HG assembly 1 from being bent by its restitutive force while allowing it to play slightly.

The HG assembly 1 and the slider 25 are thus attached to the bonding jig 50 respectively as shown in FIG. 6. If a worker rotates the HG assembly holding plate 51 in the direction of an arrow F against the deviating force so as to be held approximately horizontally, the locking hook 66 is fit in the engaging hole 67 formed on the top surface 54 so as to face the HG assembly holding plate 51, thereby the hook 66 is locked and the HG assembly holding plate 51 is kept horizontally.

At this time, a center line 106 passing the center of the bonding surface 25a of the slider 25 in parallel with the top surface 54 and orthogonal to the parallel line of the rotary shaft 52 approximately consists with the 100x axis of the flexure 8 (FIG. 3), thereby the flexure tongue 20 of the HG assembly 1 comes in contact with the bonding surface 25a of the slider 25 as to be described later.

Consequently, while the HG assembly holding plate 51 is set vertically as shown in FIG. 6, a low modulus epoxy adhesive is dispensed on the bonding surface 25a (FIG. 7) of the slider 25, then the HG assembly holding plate 51 is rotated until it is locked at a horizontal position. The flexure tongue 20 is thus pressed slightly by the suspension against the bonding surface 25a of the slider 25 so as to be combined together with the adhesive therebetween. More preferably, the contact portion should be vibrated while it is pressed, so that the low viscosity adhesive uniformly spreads all over the bonding surface between the bonding surface 25a and the flexure tongue 20. The slider 25 and the flexure tongue 20 can thus be uniformly bonded. In this stage, however, the adhesive is not set yet, since it is not heated.

FIG. 8 is a schematic view of a laser tacking apparatus 80 used for the method for bonding a slider and a suspension together in a first embodiment of the present invention.

Inside a safety box 81 is disposed a table guide 83 and a stage 82. The stage 82 is supported by driving means (not shown) movably in the directions of an arrows J and K. At the left tip (in FIG. 8) of this stage 82 is disposed a contact guide roller 82a that comes in contact with a cover 86.

The cover 86 is held rotationally in the directions of the arrows L and M in the lower portion of the left side surface 81a so as to open/close an opening (not shown) formed at the left side surface 81a of the safety box 81. In addition, this cover 86 is forced to move in the direction of the arrow M by an external force. When this external force does not work, the cover 86 is rotated in the direction of the arrow M so as to close the opening.

On the top surface of the stage 82 are disposed a stopper guide 84 and a clamper 85 used to position the bonding jig 50 and fix it temporarily between them. A rod 85a of the clamper 85 is slid in the direction of an arrow J or K by the driving means provided in the clamper 85.

A laser oscillator 87 outputs a laser beam oscillated continuously with use of, for example, a high output semiconductor (wavelength l=700 nm to 1000 nm) to a laser output port 89 disposed in the safety box 81 through optical fiber 88. The laser output port 89 is composed of condensing lenses 89a and 89b disposed inside it so as to output the beam axis 107 approximately in parallel to the table 82 moving in the directions J and K, thereby the entered laser beam is condensed and output. The laser beam on the beam axis 107 is adjusted so as to be condensed to a diameter of approximately 0.2 mm to 0.6 mm at an irradiation point IP to be described later.

A hood 91 is disposed so as to discharge a gas generated around the irradiating point IP on the beam axis 107 out of the safety box 81 as to be described later through a duct leading to outside the safety box 81. The hood 91 is thus provided with a suction port disposed in the upper portion of the hood 91.

The method for bonding a slider and a suspension together in the above embodiment of the present invention uses a laser tacking apparatus 80 composed as described above. Hereunder, how to use the laser tacking apparatus 80 will be described. A series of operations of the apparatus to be described below are controlled by command signals output from a control unit (not shown) to respective driving units according to the instructions of the worker. The description of the configuration of the apparatus will be omitted here.

At first, the driving means (not shown) moves the stage 82 in the direction of the arrow J up to a position shown with a two-dot chain line in FIG. 8. At this time, the contact guide roller 82a disposed at the left tip keeps pressing the cover 86, thereby rotating the cover 86 in the direction of the arrow L up to a position shown with a two-dot chain line in FIG. 8. When the table 82 reaches the object position in the direction of the arrow J, the rod 85a of the clamper 85 withdraws into the clamper 85.

The worker then puts the bonding jig 50 on the stage 82 so that the bottom 68 of the bonding jig 50 comes in contact with the counter-surface 84a of the stopper guide 84. At this time, the bonding jig 50 enables that the locking hook 66 of the HG assembly holding plate 51 shown in FIG. 6, fit in the engaging hole 67 on the top surface 54 of the bonding jig, is locked and the flexure tongue 20 of the HG assembly 1 comes in contact with the bonding surface 25a of the slider 25 with a low modulus epoxy adhesive therebetween.

The bonding jig 50 put on the stage 82 by the worker is prevented from moving in the three directions, since it is in contact with each counter-surface of the stopper guide 84 at its bottom 68 and at its both side surfaces. In addition, because the top surface 51a of the HG assembly holding plate 51 is pressed by the rod 85a protruding from the clamper 85, the bonding jig 50 is fixed at a predetermined position on the stage 82.

After that, the worker moves the stage 82 in the direction of the arrow K up to a working position shown with a solid line in FIG. 8. At this time, the cover 86 is rotated again in the direction M to close the opening thereby sealing the safety box 81 up so as to prevent the laser beam from leaking. The safety of the laser beam is thus more improved.

FIG. 9 shows a cross sectional view of a portion in the neighborhood of the slider 25 at the center line 106 (FIG. 6) when viewing it from the direction of the arrow G.

As shown in FIG. 9, the working position of the stage 82 is adjusted beforehand so that the flexure tongue 20 stops at the irradiation point IP. In addition, the positions of the stopper guide 84 and the laser output port 89 are decided beforehand so that the beam axis 107 of the focused laser beam 92 output from the laser output port 89 crosses the center line 106 passing the center of the bonding surface 25a of the slider 25 at right angles and passes the center of the irradiation spot 93 separated by a predetermined distance J from the front surface 25b of the slider 25.

In such state, the laser oscillator 87 is operated, thereby the focused laser beam 92 output from the laser output port 89 is irradiated at the irradiation spot 93 of the flexure tongue 20, so that part of the low modulus epoxy adhesive 69 is cured by the heat of the laser beam. The irradiation opening 46 of the load beam 6 is set so as not to disturb the route of the focused laser beam 92 at this time and the distance J of the beam axis 107 from the front surface 25b of the slider 25 is decided so as to form the irradiation spot 93 at a desired position on the flexure tongue 20. And, a gas is generated when part of the low modulus epoxy adhesive 69 is cured with the heat of the laser beam and the gas is sucked into the hood 91, thereby it is discharged out of the safety box 81.

If the slider 25 is 1.2 mm in length (L) and 1 mm in width (W) as shown in FIG. 10, the beam should preferably be 0.2 mm to 0.6 mm in diameter at the irradiation spot 93 by taking various restrictions of the design into consideration.

The irradiation time and the output value of the laser beam are set beforehand so that the MR head 26 and the write head 27 disposed at the slider 25 are not exposed to a predetermined upper limit temperature, that is, over 120° C. and the low modulus epoxy adhesive set by heat can have a desired strength by means of partial irradiation using the focused laser beam. For example, the laser beam is irradiated at an output value of several watts for 10 seconds.

According to the method for bonding a slider and a suspension together in the first embodiment of the present invention, when a thermosetting low modulus epoxy adhesive 69 (FIG. 9) is used to bond the flexure tongue 20 and the slider 25 together, the flexure tongue 20 and the slider 25 are bound with the adhesive therebetween first, then part of the bond position between those items 20 and 25 is heated for a short time, thereby curing the adhesive there so as to be fixed together temporarily at a predetermined strength. Consequently, it is possible to put the HG assembly 1 independently in a controlled temperature chamber or moved from process to process without using any bonding jig 50.

Next, a description will be made of a method for deciding conditions for laser beam irradiation in a second embodiment of the present invention.

To decide both laser output and irradiation time of the above described focused laser beam 92 irradiated at the irradiation spot 93 and set an irradiation spot on the slider 25, various conditions are taken into consideration. What must be considered first is that the MR head 26 (FIG. 10) disposed at the slider 25 must not be heated over the upper limit temperature, for example, 120° C. or over.

This is why it is avoided to directly measure the temperature of the MR head 26 to be damaged easily by a static electricity or the like. Instead, the resistance value of the coil of the write head 27 disposed in the neighborhood of the MR head 26 is measured, thereby the temperature of the MR head 26 is measured indirectly. Consequently, it is possible to decide conditions of laser beam irradiation so as to prevent the detected temperature from exceeding a predetermined upper limit value and obtain a desired strength of temporary fixing of the flexure tongue 20 and the slider 25. The method for deciding conditions will be described below.

At first, in order to check the temperature property of the coil resistance of the write head 27, the slider 25 (FIG. 10) on which both MR head 26 and write head 27 are disposed adjacently is put in a controlled temperature chamber and heated, while the temperature of the coil, that is, a relationship between changes of the temperature in the chamber and changes of the resistance value of the coil is checked. A four-wire ohm measurement 94 (FIG. 11) is used to reduce the measurement error during the measurement of the resistance value.

As shown in FIG. 10, the write head 27 is disposed adjacent to the MR head 26 so that part of the write head 27 reaches the center lower portion of the front surface 25b of the slider 25. Both ends of the coil are connected electrically to the pads 25c and 25d formed on the same front surfaces. On the other hand, the MR head 26 is connected electrically to the pads 25e and 25f. FIG. 11(b) shows those connections.

FIG. 11(a) is a circuit diagram indicating a relationship between the four-wire ohm measurement 94 and the write head 27. A pad 25c is connected to a terminal 94a and a voltage measurement terminal 94b of the meter 94 through different leads 95a and 95b respectively. A pad 25d is connected to a terminal 94d and a voltage measurement terminal 94c of the meter 94 through different leads 95c and 95d respectively.

In this state, a constant current Id is flowed in the circuit between each of the terminals 94a and 94d and the write head 27, thereby detecting a voltage Vd between the voltage measurement terminals 94b and 94c, that is, a voltage difference between both pads. Then, the resistance value Rd of the coil at that time is calculated from Vd/Id. With such measurement among the four-terminals, the resistance value between pads can be measured. The resistance between the leads 95a and 95d is excluded from the measured resistance value Rd.

FIG. 12 is a graph indicating temperature properties of the resistance of the coil of the write head 27 measured as described above. As shown clearly in FIG. 12, the resistance value is changed in proportion to the temperature. This is why the resistance value of the write head 27 is measured, thereby it is possible to know the temperature of the head unit 96 (FIG. 10) at which both write head 26 and MR head 27 are disposed adjacently.

Next, a description will be made of measurement results of various tests carried out by detecting the temperature of the head unit 96 while measuring the resistance of the coil of the write head 27.

FIG. 13 is a graph indicating a relationship between an irradiation time and temperature changes of the head unit 96 when the output of the laser beam irradiated at the irradiation spot 93 is changed in steps as a parameter by setting a distance between the head unit 96 disposed at the slider 25 and the center of the irradiation spot 93 shown in FIG. 10 to a predetermined value.

As to be understood from the results shown in FIG. 13, if the laser output is constant, the laser output enters a steady-state in a predetermined time Tk (about 5 sec) after the irradiation begins, thus the temperature of the head unit 96 is fixed. The temperature rises in proportion to the laser output. The main factor for obtaining this temperature properties will possibly be a heat applied by laser beam irradiation and transferred to the bonding jig 50 having a larger thermal capacity through the slider 25 and/or flexure 8, thereby the temperature is distributed in a stable manner according to the irradiation power.

FIG. 14 is a graph indicating a relationship between a distance between the head unit 96 and the center of the irradiation spot 93 and temperature changes of the head unit 96 when the output of the irradiated laser beam onto the irradiation spot 93 (FIG. 10) is changed in steps as a parameter. As to be understood from the result shown in FIG. 14, the temperature of the head unit 96 is decreased in proportion to the distance to the irradiation spot and increased in proportion to the laser output.

FIG. 15 is a graph indicating a relationship between an irradiation time and a bonding strength when a focused laser beam 92 is irradiated at the irradiation spot 93 of the flexure tongue 20 according to a predetermined output when the flexure tongue 20 is bound on the bonding surface 25a of the slider 25 with a low modulus epoxy adhesive 69 therebetween as shown in FIG. 9. As to be understood clearly from the result shown in FIG. 15, the bonding strength is increased in approximate proportion to the irradiation time.

According to the test results described above and taking various such conditions as the shape of the HG assembly, etc. into consideration, both irradiation point and output of the laser beam are decided first, then an irradiation time is decided so as to obtain a desired bonding strength at the decided laser output. Those decisions are done before the HG assembly is fabricated. In actual fabrication processes, the focused laser beam is irradiated at the irradiation spot 93 for a predetermined time according to a predetermined output in the thermosetting process described with reference to FIG. 9.

As described above, according to the method for deciding conditions of laser beam irradiation in the second embodiment of the present invention, the resistance value of the head is detected, thereby monitoring the temperature of the head unit. Consequently, the temperature of the head never exceeds a predetermined limit value for protecting the head, for example, 120° C. and both output value and irradiation time of the laser beam can be set so as to obtain a desired bonding strength through thermosetting for part of the low modulus epoxy adhesive.

Although the irradiation point of the laser beam is set near the rear surface of the slider in the above embodiments, the point is not limited only to that; the point may be set near the front surface of the slider according to the shape of the suspension, etc.

Furthermore, although the resistance value of the write head coil is measured, thereby detecting the temperature of the head in the above embodiments, the resistance value of the MR head may be measured, thereby detecting the temperature of the head if preventive measures are taken enough for static electricity.

According to an aspect of the present invention, therefore, when a thermosetting low modulus epoxy adhesive is used to bond a suspension and a slider together, the suspension and the slider are bound with the adhesive therebetween first, then part of the bond position is heated for a short time so as to be cured and the suspension and the slider are fixed together temporarily. It is thus possible to put the HG assembly in a controlled temperature chamber independently or move the HG assembly from process to process without using any bonding jig, thereby both space usage efficiency in the chamber and thermal efficiency can be improved, thereby the work efficiency can be improved.

Furthermore, according to another aspect of the present invention, it is possible to measure the resistance value of the head and monitor the temperature of the head unit so as to set conditions of laser beam irradiation when in the above thermosetting processing. Consequently, it is possible to set both output value and irradiation time of the laser beam so as not to exceed a predetermined upper limit temperature of the head unit, for example, 120° C., thereby the temporary fixing work of the slider and the suspension can be improved without damaging the MR head whose heat resistance is especially low, thereby improving the work efficiency.

What is claimed is:

1. A method for bonding a slider having a head to a suspension, comprising the steps of:
   applying a low modulus epoxy adhesive between the slider and the suspension;
   holding the slider and the suspension in a pressed state with a bonding jig while the low modulus epoxy adhesive is interposed therebetween to form an assembly;
   vibrating the slider and the suspension while in the pressed state so that the low modulus epoxy adhesive uniformly spreads therebetween; and then
   thermosetting a part of the low modulus epoxy adhesive by applying a laser beam to the assembly to cure the part, wherein the laser beam is applied to a surface of the suspension where the suspension contacts the low modulus epoxy adhesive; wherein conditions of laser beam irradiation are set for at least an output value and an irradiation time, comprising the steps of:
      checking a temperature property of a resistance value of a head disposed at the slider; and
      detecting an ambient temperature of the head by measuring the resistance value; and wherein
      the output value and the irradiation time of the laser beam are decided so as to obtain a desired bonding strength of the low modulus epoxy adhesive through thermosetting of said part of the adhesive by irradiation of the laser beam within a predetermined upper limit temperature of the head; and then
   heating the slider and the suspension that are bonded together in a controlled temperature chamber after part of the adhesive is cured by the laser beam so as to cure a residual part of the adhesive.

2. The method for bonding a slider to a suspension according to claim 1, wherein a beam axis of the laser beam hits the surface in an approximately vertical direction.

3. The method for bonding a slider to a suspension according to claim 2, wherein the laser beam is approximately 0.2 mm to 0.6 mm in diameter at its irradiation point, and the slider is approximately 1.2 mm in length and 1 mm in width.

4. The method for bonding a slider to a suspension according to claim 2, wherein the laser beam is applied only at a predetermined output value and only for a predetermined time.

5. The method for bonding a slider to a suspension according to claim 1, wherein the resistance value of the head is defined as a resistance value of a write head coil.

6. The method for bonding a slider to a suspension according to claim 1, wherein a constant current is applied between a pair of pads formed at the slider so as to be connected electrically to the coil when the resistance value is measured so that the resistance value is found from both the current value and a voltage measured between the pads with use of a four-wire ohm measurement.

7. A method for bonding a slider having a head to a suspension, comprising:
   applying a low modulus epoxy adhesive between the slider and the suspension;
   holding the slider and the suspension in a pressed state with a bonding jig while the low modulus epoxy adhesive is interposed therebetween to form an assembly;
   vibrating the slider and the suspension while in the pressed state so that the low modulus epoxy adhesive uniformly spreads therebetween;
   thermosetting a part of the low modulus epoxy adhesive by applying a laser beam to the assembly to cure the part, wherein the laser beam is applied to a surface of the suspension where the suspension contacts the low modulus epoxy adhesive, the laser beam having a beam axis that hits the surface in an approximately vertical direction, and the laser beam being 0.2–0.6 mm in diameter at its irradiation point, the slider being 1.2 mm in length and 1 mm in width, and the laser beam being applied only at an output value and only for an irradiation time, such that conditions of laser beam irradiation are set for at least the output value and the irradiation time, the output value and the irradiation time of the laser beam being decided so as to obtain a desired bonding strength of the low modulus epoxy adhesive through thermosetting of said part of the adhesive by irradiation of the laser beam within an upper limit temperature of the head;
   heating the slider and the suspension that are bonded together in a controlled temperature chamber after part of the adhesive is cured by the laser beam so as to cure a residual part of the adhesive;
   checking a temperature property of a resistance value of a head disposed at the slider, the resistance value of the head being defined as a resistance value of a write head coil;
   detecting an ambient temperature of the head by measuring the resistance value; and
   applying a constant current between a pair of pads formed at the slider so as to be connected electrically to the coil when the resistance value is measured so that the resistance value is found from both the current value and a voltage measured between the pads with use of a four-wire ohm measurement.

* * * * *